United States Patent
Wang (10) Patent No.: US 10,752,202 B2
(45) Date of Patent: Aug. 25, 2020

(54) THREE-POINT SEAT BELT WITH ADDITIONAL SAFETY FEATURES

(71) Applicant: AUTOLIV ASP, INC., Ogden, UT (US)

(72) Inventor: Bin Wang, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 34 days.

(21) Appl. No.: 16/031,608

(22) Filed: Jul. 10, 2018

(65) Prior Publication Data

US 2020/0017063 A1 Jan. 16, 2020

(51) Int. Cl.
*B60R 22/02* (2006.01)
*B60R 22/40* (2006.01)

(52) U.S. Cl.
CPC ............ *B60R 22/023* (2013.01); *B60R 22/40* (2013.01); *B60R 2022/027* (2013.01)

(58) Field of Classification Search
CPC . B60R 22/023; B60R 2022/027; B60R 22/40; B60R 2022/207; B60R 2022/1818; B60R 22/024; B60R 2022/4833; B60R 22/19; B60R 22/18; B60R 22/28; B60R 2022/283; B60R 2022/288; B60R 21/055
See application file for complete search history.

(56) References Cited

U.S. PATENT DOCUMENTS

| 3,547,468 | A | * | 12/1970 | Giuffrida | ................ B60R 22/28 297/472 |
| 3,885,811 | A | * | 5/1975 | Takada | ............... A44B 11/2549 297/483 |
| 3,890,002 | A | * | 6/1975 | Warmskessel | .......... B60R 22/18 297/472 |
| 3,891,272 | A | * | 6/1975 | Takada | .................... B60R 22/16 297/472 |
| RE29,147 | E | * | 3/1977 | Fiala | ....................... B60R 22/28 242/379.1 |
| 4,138,157 | A | * | 2/1979 | Pickett | .................... B60R 22/16 297/472 |
| 4,588,208 | A | * | 5/1986 | Yoshitsugu | ............. B60R 22/16 188/376 |
| 4,886,296 | A | * | 12/1989 | Brodmann | .............. B60R 22/28 280/805 |
| 5,076,608 | A | * | 12/1991 | Shimose | ............... B60R 22/001 280/801.1 |

(Continued)

*Primary Examiner* — Paul N Dickson
*Assistant Examiner* — Kurtis Nielson
(74) *Attorney, Agent, or Firm* — Dickinson Wright PLLC (57) ABSTRACT

A motor vehicle belt restraint system combining a three-point active seatbelt system with a two-point seatbelt system. The webbing of the three-point seatbelt is allowed to slide through a latch plate releasably attached to a seatbelt buckle. The webbing of the two-point belt system is affixed to the latch plate. When in use, the belt systems combine to provide two lap belt segments extending across the lower torso of a vehicle seat occupant with a single diagonal shoulder belt section. Additional embodiments incorporate the use of an anchor mechanism for the three-point belt system having additional capabilities including a webbing release and a load limiting function. Further embodiments provide different arrangements for the two lap belt sections.

23 Claims, 5 Drawing Sheets

(56) References Cited

U.S. PATENT DOCUMENTS

| | | | | |
|---|---|---|---|---|
| 5,529,343 A * | 6/1996 | Klink | .................. | B60R 22/16 |
| | | | | 280/805 |
| 5,658,012 A * | 8/1997 | Villarreal | ................ | B60R 22/16 |
| | | | | 280/805 |
| 5,700,034 A * | 12/1997 | Lane, Jr. | ................ | B60R 21/01 |
| | | | | 280/805 |
| 5,788,280 A * | 8/1998 | Ohsumi | ............... | B60R 22/023 |
| | | | | 280/805 |
| 5,909,927 A * | 6/1999 | Henshall | ............... | B60R 22/105 |
| | | | | 280/801.1 |
| 6,276,715 B1 * | 8/2001 | Takeuchi | ................ | B60R 21/18 |
| | | | | 280/728.1 |
| 6,802,470 B2 * | 10/2004 | Smithson | ............... | B60R 22/40 |
| | | | | 242/383 |
| 7,988,196 B2 * | 8/2011 | Wang | ................... | B60R 22/023 |
| | | | | 280/801.1 |
| 10,464,521 B2 * | 11/2019 | Jaradi | .................... | B60R 22/18 |
| 2007/0075580 A1 * | 4/2007 | David | ................... | B60R 22/024 |
| | | | | 297/468 |
| 2011/0121120 A1 * | 5/2011 | Ogawa | ............... | B60R 22/4676 |
| | | | | 242/379.1 |
| 2011/0133439 A1 * | 6/2011 | Pearce | ................... | B60R 22/28 |
| | | | | 280/805 |
| 2011/0270493 A1 * | 11/2011 | Tanaka | ................... | B60R 22/46 |
| | | | | 701/45 |
| 2017/0225649 A1 * | 8/2017 | Jaradi | ................ | B60R 22/1952 |
| 2019/0106080 A1 * | 4/2019 | Jaradi | .................... | B60R 22/18 |
| 2019/0193673 A1 * | 6/2019 | Williams | ................ | B60R 22/28 |
| 2019/0202397 A1 * | 7/2019 | Jaradi | ................ | B60R 22/1952 |

\* cited by examiner

THREE-POINT SEAT BELT WITH ADDITIONAL SAFETY FEATURES

FIELD OF THE INVENTION

This invention relates to a motor vehicle belt type restraint system having enhanced occupant restraint capabilities.

BACKGROUND

Motor vehicle manufacturers and suppliers of safety restraint systems constantly strive to provide enhanced occupant protection systems for restraining an occupant in the event of impact or rollover events. One class of restraint systems are referred to as active restraints in which the vehicle occupant deploys the system through some action such as fastening a seatbelt latch plate into a buckle. Most frequently, so-called three-point belt systems are used in passenger motor vehicles, particularly for front seat occupants. In a three-point restraint system, a separate lap belt or a lap belt segment of the belt webbing crosses the occupant's pelvis and is primarily employed for restraining displacement of the pelvis during an impact or rollover event. A shoulder belt or a shoulder belt segment of the webbing normally passes diagonally across the upper torso of the occupant, from a lower hip point, across the occupant's chest and to an anchorage. These systems function well to provide vehicle occupant restraint and protection, is but there remains a constant striving for enhanced performance.

Vehicle manufacturers and their suppliers along with governmental regulatory bodies impose safety related regulations affecting the design of automobiles and equipment provided on them for occupant protection. In addition to the active restraints mentioned previously, so-called passive systems such as inflatable restraints are also commonly implemented. Governmental agencies as well as the vehicle manufacturers and their related supply chain participants utilize surrogate devices referred to as an anthropomorphic test device (or dummy) (ATD) for testing the performance of vehicle impact safety systems. Vehicles sold or used in the United States must meet certain National Highway Traffic Safety Administration (NHTSA) rules, referred to as Federal Motor Vehicle Safety Standards (FMVSS) for impact protection and safety. Corresponding sets of regulatory requirements are in place throughout the world. For establishing compliance with some of these standards, an ATD known as the Hybrid III (or HIII) is currently used for evaluation. The Hybrid III test dummy provides a great deal of instrumentation data which has been correlated to human impact tolerance which in turn gives rise to certain minimum performance values established by the applicable standards.

More recently, a next-generation ATD is being deployed referred to as the THOR (or Test device for Human Occupant Restraint) dummy. The THOR dummy was developed to provide even more detailed and sophisticated data related to human impact tolerance and is believed to have a higher degree of biofidelity than the current Hybrid III dummy. Adoption of the THOR dummy is likely to be an impetus for further safety regulation promulgation and also provides a tool for manufacturers to enhance occupant protection. Studies with the THOR dummy along with field data have shown that high chest deflection during a frontal impact event is correlated to occupant injury severity and fatality. This information in part is spurring development of advanced vehicle restraint systems which effectively reduce chest deflection.

Presently available motor vehicles typically combine active and passive restraint systems. In frontal impact conditions, both belt-type active restraint systems and frontal impact inflatable restraints combine to restrain the occupant. However, even with the use of such systems cooperating to provide occupant restraint, there remains a desire for further enhancements in frontal impact protection and a reduction of chest deflection in particular. Reductions of chest deflection may be provided in accordance with this invention through improved restraint of the occupant's pelvis during a restraint event.

SUMMARY

In accordance with the present invention the above objectives are addressed through embodiments incorporating a three-point active seatbelt system with an auxiliary two-point seatbelt. These embodiments are intended to reduce frontal impact chest deflection by redirecting impact forces from the chest to the pelvis. Since the system has four anchor points to the vehicle, it is referred here as a four-point restraint system. Further embodiments employ a switchable load limiting anchor and a two slot latch plate. Other components typically used in seatbelt restraint systems are also incorporated into embodiments of the present invention.

DETAILED DESCRIPTION

Figure 1:
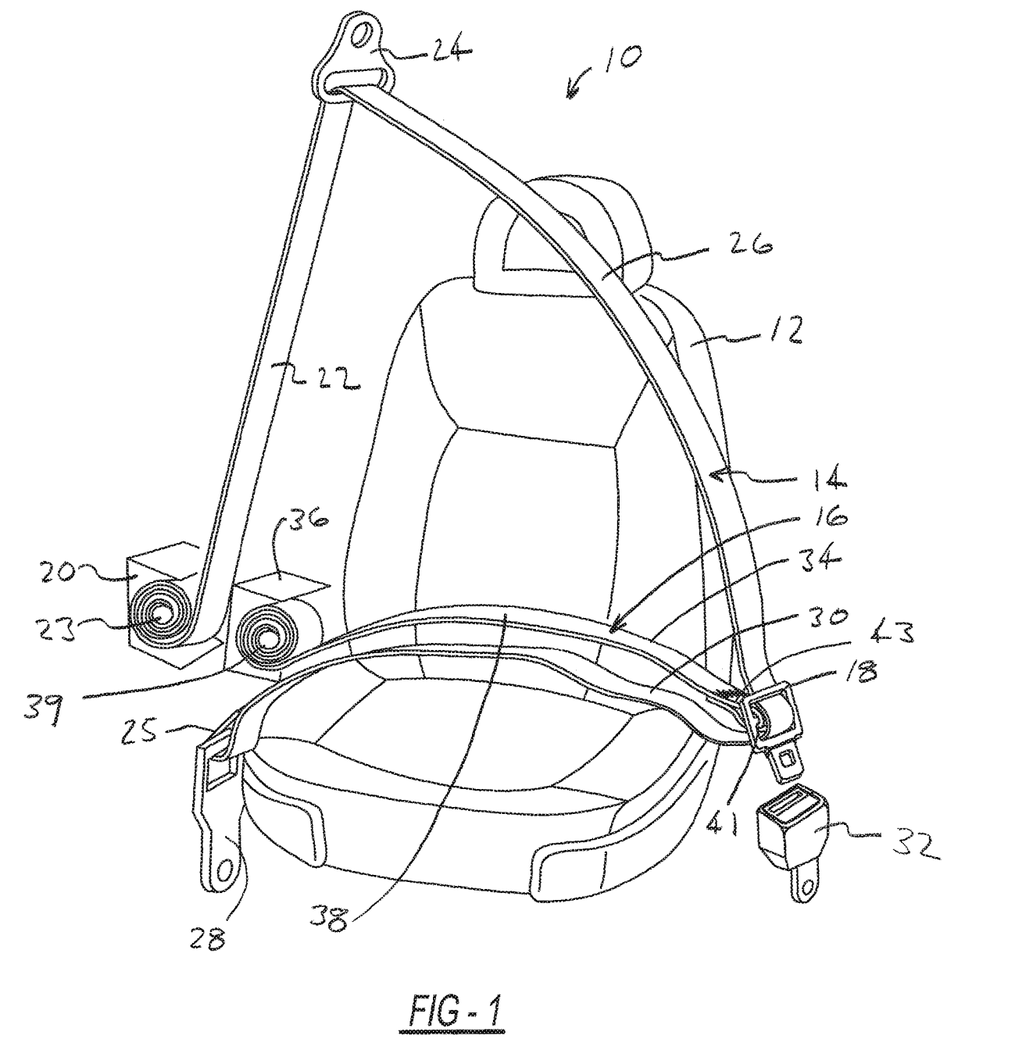
FIG. 1 is a perspective view of an embodiment of the present invention.

A four-point seatbelt system in accordance with the present invention is illustrated in FIG. 1 and is generally designated by reference numeral 10. Seatbelt system 10 is shown installed in a vehicle (not shown) and dedicated for use by an occupant of example motor vehicle seat 12. Seatbelt system 10 has as principal subassemblies, three-point belt assembly 14 and an auxiliary two-point lap seatbelt assembly 16. Three-point belt assembly 14 and two-point belt assembly 16 are joined together at latch plate 18 as is described in more detail in the following description.

Except as otherwise described herein, three-point belt assembly 14 has some features found in three-point belt assemblies of generally conventional design. Retractor 20 is provided for extraction and retraction of seatbelt webbing 22 and can have numerous optional features present in commonly available seatbelt retractors. For example, in addition to providing a spring loaded rewind function for storing a length of webbing 22, retractor 20 also typically has a retractor spindle locking mechanism which restricts extraction of the webbing in the event of a vehicle impact or other dangerous condition. Vehicle sensitive inertial mechanisms are normally provided within such retractors and respond to conditions of vehicle deceleration or inclination to lock webbing 22. Belt sensitive locking mechanisms may also be incorporated which actuate upon detection of belt extraction exceeding a predetermined rate. Numerous other functions are available in modern seatbelt retractors which may be provided for retractor 20, such as load limiting systems often using internal torsion bars or other features which act to limit loads acting on webbing 22 in a restraint event. Active pretensioning systems such as a pyrotechnically actuated roto-pretensioner can also be incorporated which are activated to rapidly retract webbing 22 to remove or reduce webbing slack upon the detection of a vehicle impact event. Such systems enhance the early coupling and restraint effect between the webbing and the occupant for enhanced performance. Still further systems and functions can be incorporated for retractor 20, including but not limited to so-called pre-pretensioners which reversibly control webbing extraction and retraction which can be used for preconditioning the system for an imminent impact or other dangerous condition. Seatbelt retractor 20 used in accordance with the present invention may have any one or more of these advanced retractor functions and features or alternatively can be of a basic type with simplified functional capabilities.

Belt webbing 22 forms two opposite ends 23 and 25, and extends from retractor 22 and through guide loop 24 which is positioned above the shoulder area of an occupant seated within seat 12. Guide loop 24 is securely mounted to a vehicle structure (not shown). Webbing 22 passing through guide loop 24 extends diagonally across the upper torso area of an occupant and forms shoulder belt section 26 when the belt system is fastened. Webbing 22 passes through latch plate 18 and is designed to freely flow through the latch plate during the process of donning and doffing the seatbelt system, and also will likely slide through the latch plate during a restraint event. Webbing 22 extending from latch plate 18 is mounted to anchor plate 28 at end 25 and forms a lower lap belt section 30 of the webbing. In this first embodiment, anchor plate 28 is shown as having a simplified configuration which provides a fixed structural mount for terminal end 25 of the webbing. Latch plate 18 is releasably connected to buckle 32, which in turn is mounted to vehicle structure. As mentioned previously, further advanced configurations of the above-described elements can be provided, such as pretensioning and load limiting functions associated with one or more of anchor plate 28, buckle 32, and guide loop 24. Moreover, latch plate 18 can incorporate, if desired, crash locking or webbing gripping features to restrict the transfer of the webbing between lap belt section 30 and shoulder belt section 26 during an impact event.

Three point belt assembly 14 as described above is of a single retractor variety in which webbing 22 passes freely through latch plate 18 during the process of donning and doffing the belt assembly. Thus, when the system is not being used, latch plate 18 can be positioned for easy access between the vertically extending sections of webbing 22. When latch plate 18 is actively attached to buckle 32, webbing 22 can be extracted to provide a comfortable length of lap belt section 30, and retractor 20 takes up slack present within shoulder belt section 26.

As mentioned previously, the present invention is focused on enhancing occupant restraint by reducing or better controlling pelvic excursion (displacement) of the occupant with the attendant transfer of webbing from the lap belt section 30 to the shoulder belt section 26, which in turn leads to higher chest loading and deflection. More effective control of excursion of the pelvis is provided by embodiments of the present invention provided through the addition of two-point belt assembly 16, combined with three-point belt assembly 14. Since system 10 provides four points of attachment to vehicle structure, it may be referred to here as a four-point belt restraint system. The presence of two-point belt assembly 16 provides a second lap belt section 34 which crosses the pelvis of the occupant when the system is deployed. Webbing 38 of two-point belt assembly 16 is mounted at one end 39 for retraction within a second retractor 36 and at opposite end 41 which terminates at latch plate 18. Retractor 36 can be of a simplified configuration with an inertial and/or belt sensitive locking system or, in one preferred embodiment, would incorporate a pretensioning function such as a known pyrotechnic roto-pretensioner system. These systems are available in configurations which lock the retractor spindle after pretensioning retraction occurs. A form of locking mechanism is preferred for incorporation into retractor 36, either of an inertial sensing type or acting subsequent to pretensioning actuation as mentioned above. Retractor 36 may be provided in a compact size since conventional webbing sensing and vehicle sensing locking mechanisms are not necessary if the retractor incorporates a pretensioning function and locks at the end of pretensioning retraction. Simplified functionality of retractor 36 in some embodiments will facilitate a reduction in the size of the retractor and make it easier for packaging or integrating the system into a vehicle body or seat.

Figure 2:
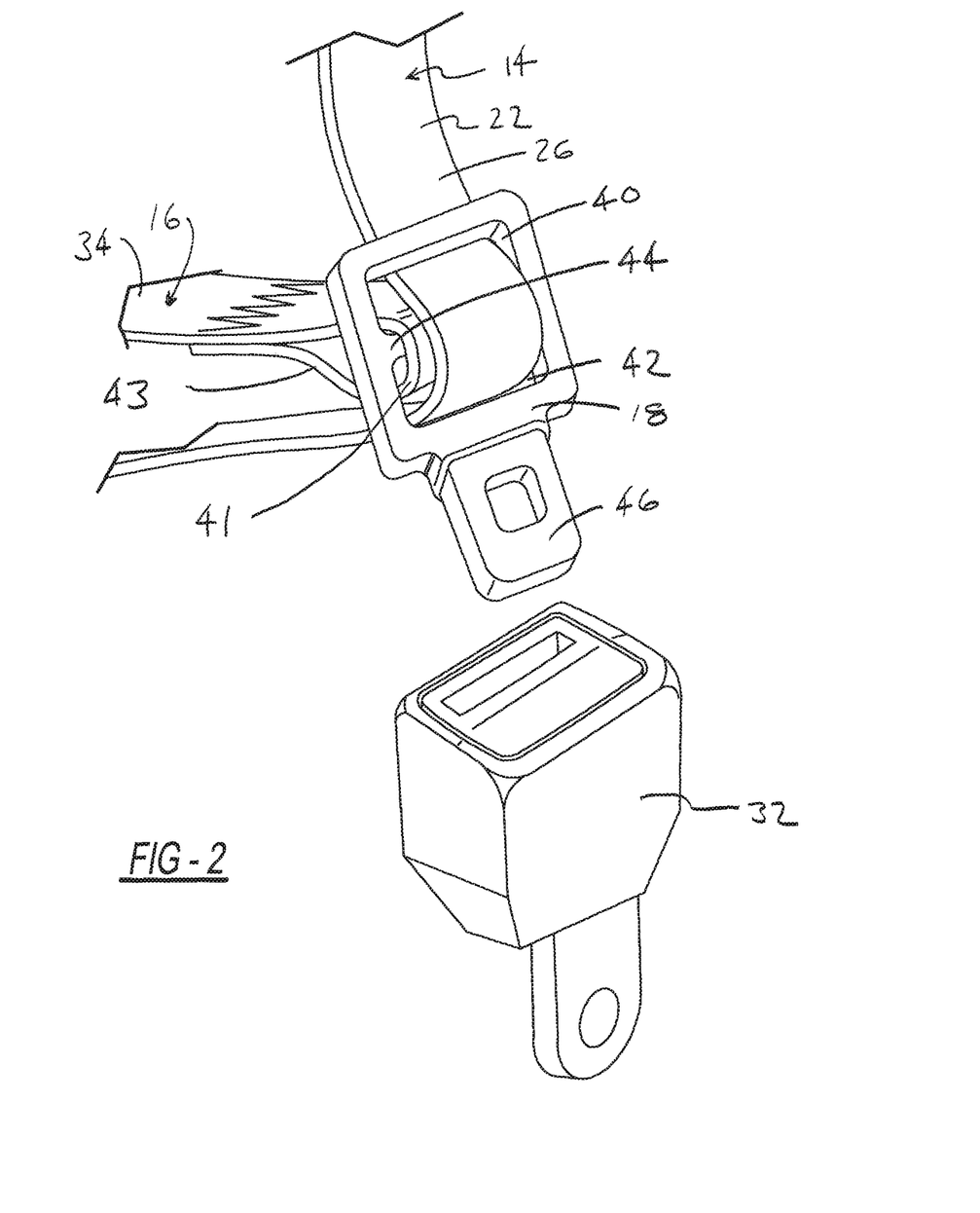
FIG. 2 is a detailed pictorial view of the latch plate and buckle components of the seatbelt system in accordance with this invention.

Latch plate 18 is shown in more detail with reference to FIG. 2; as shown by the figure, latch plate 18 forms two slots 40 and 42. Webbing 22 of three-point belt assembly 14 passes through both slots 40 and 42 and passes freely through the slots during normal usage of the belt system, and potentially also during a restraint event as described previously. Webbing 38 of two-point belt assembly 16 forms a sewn-together loop 43 at bridge 44 between slots 40 and 42, and as mentioned previously, terminates and is supported there. Latch plate 18 includes other features found in conventional active belt systems, including extending latching tab 46 for releasable attachment with buckle 32.

Four-point seatbelt system 10 can be used in a generally familiar and common manner by an occupant, typical of every day three-point type belt restraint systems. Latch plate 18 is grasped and fastened into buckle 32. Retractor 20 freely pays out webbing during this process, as does retractor 36. Once the belt system is fastened, the occupant has both the lap belt section 30 and the two-point lap belt 16 crossing their pelvis, with a single shoulder belt section 26.

In the event of a frontal impact restraint event with four-point seatbelt system 10 properly fastened for restraining the occupant, pelvic loading forces are distributed onto both three-point belt assembly lap belt section 30 and webbing 38 of two-point belt assembly 16. Retractor 36 can lock at an early stage in the restraint event sequence which serves to provide enhanced frontal impact restraint of the occupant's pelvis. Forward upper torso excursion of the occupant is restricted through an action of shoulder belt section 26 since very little of three-point belt assembly lap belt section 30 transfers through latch plate 18 in such conditions. Consequently, early coupling and restraint of the occupant's upper torso is provided, as well as a high degree of restraint for the occupant's pelvis.

Figure 3:
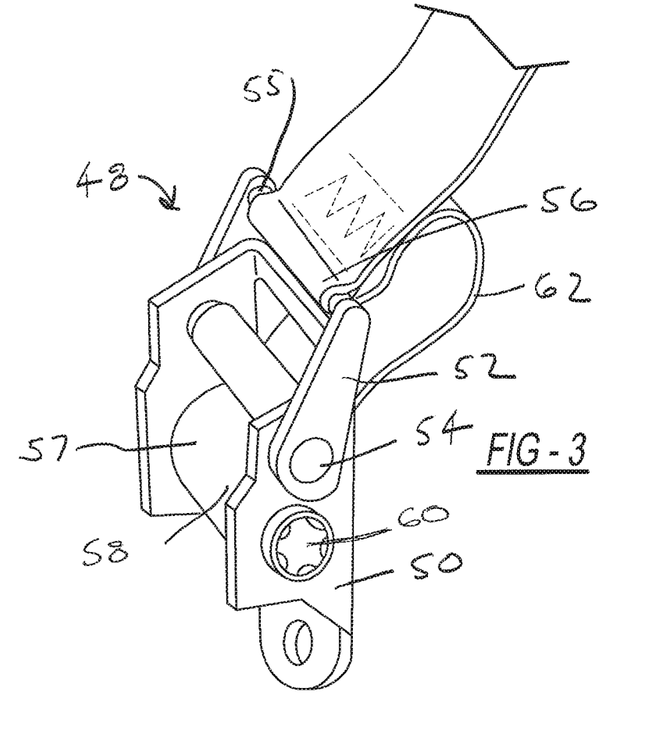
FIG. 3 is a pictorial view of an alternate embodiment of a switchable load limiting anchor which may be used in connection with the present invention.

Now with reference to FIG. 3, an alternate embodiment of anchor plate 28 is provided in the form of a load limiting anchor 48 which can be used optionally with the present invention. Anchor 48 includes fixedly mounted frame 50 with a pivot mounted yoke 52 attached to the frame via pin 54. Pin 55 is affixed to another end of yoke 52 and provides for connection with webbing loop 56 of three-point seat belt section 30. Extending from webbing loop 56 is webbing end 57 which terminates at spindle 58 which is mounted to a frame 50. A slack loop 62 of webbing 22 is provided between pin 55 and spindle 58.

Load limiting anchor 48 provides two distinct functions, which may be combined in a single device or which can be individually implemented based on design requirements and goals. One function is to allow a payout of certain length of three point belt assembly lap belt section 30 upon triggering a release of pin 55. This would allow an extra length of webbing defined by webbing slack loop 62 to be present in the three point belt lap belt section 30. This in turn would allow a transfer of webbing to three-point belt assembly shoulder belt section 26, while pelvic restraint is primarily provided by two-point belt assembly 16.

Another potential function provided by load limiting anchor 48 is to control loading applied onto webbing 22 through torsional deflection of torsion bar 60. Use of such load limiting torsion bars is well-known in the field of retractor design. When a belt load exceeds a predetermined value, torsion bar 60 twists to permit extraction of the webbing at a more controlled load level. Several wraps of the webbing 22 may be provided on spindle 58 to allow payout of a webbing due to load limiting torsional deflection of torsion bar 60.

Figure 4:
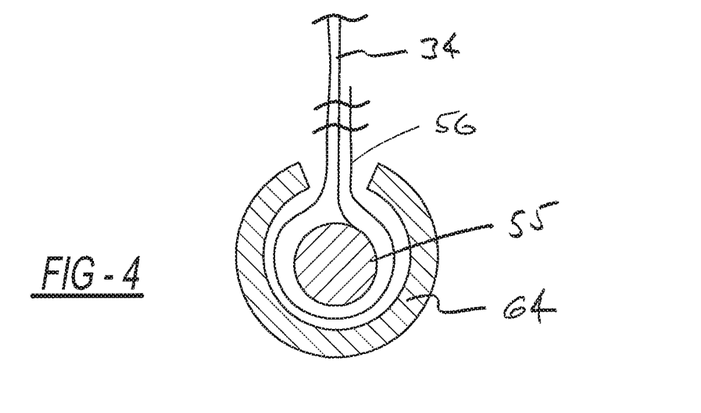
FIG. 4 is a cross-sectional view showing a releasable webbing attachment.

A sensing system (not shown) of conventional configuration may be used to sense an impact and if desired, a pyrotechnic or other system can be activated to release pin 55 which allows a length of webbing provided by webbing slack loop 62 which adds a length to lap belt section 30 during an initial phase of restraint. Thereafter, when tension is applied to lap belt section 30, belt tension is allowed to increase with the optional load limiting function provided by retractor 20. A simplified example of releasable pin 55 is shown in FIG. 4. As shown the webbing of two point lap section 30 is wrapped around and sewn to pin 55, and the pin with the webbing is loaded into slotted rail 64. Activation of the releasable pin 55 can cause the pin to disintegrate or otherwise permit the escape of webbing section 30 from rail 64.

Use of the alternate embodiment of load limiting anchor 48 with load limiting and belt release functions allows a number of operational phases described as follows as "Functions" #1, #2, #3 and #4. In Function #1, when a pretensioning of two-point belt through retractor 36 is triggered, the two-point belt restraint restrains the occupant's pelvis tightly, and the load limiting anchor 48 can provide a predetermined load level control to reduce the load acting on webbing 22 of three-point belt assembly 14 as the webbing is allowed to pass through latch plate 18 and transfer webbing from lap to shoulder sections 30 and 26, respectively.

In Function #2, load limiting anchor 48 is set at a default state such that when the pyrotechnic release of pin 55 occurs, the anchor starts releasing webbing so that load limiting function begins. For example, in a full frontal collision case, after 60 or 70 ms while the chest of deflection is high due to the combined restraint effect provided by an airbag restraint and the seatbelt switching the load limiting anchor 48.

In Function #3, the load limiting anchor 48 can have a very low limiting level or have a certain amount of webbing stored in it (such as provided by slack loop 62). When the pyrotechnic release is triggered, the anchor releases the webbing onto the three-point belt thus resulting in very low shoulder belt force as the airbag takes over the restraint for the occupant's upper torso. After the stored webbing is completely paid out, anchor 48 will still hold the webbing like a conventional anchor.

In Function #4, operation, the webbing tensioning function can be used for pretensioning immediately after a collision or at the occupant rebound, thus removing webbing slack from a first impact to be prepared for a secondary impact or rollover event.

Figure 5:
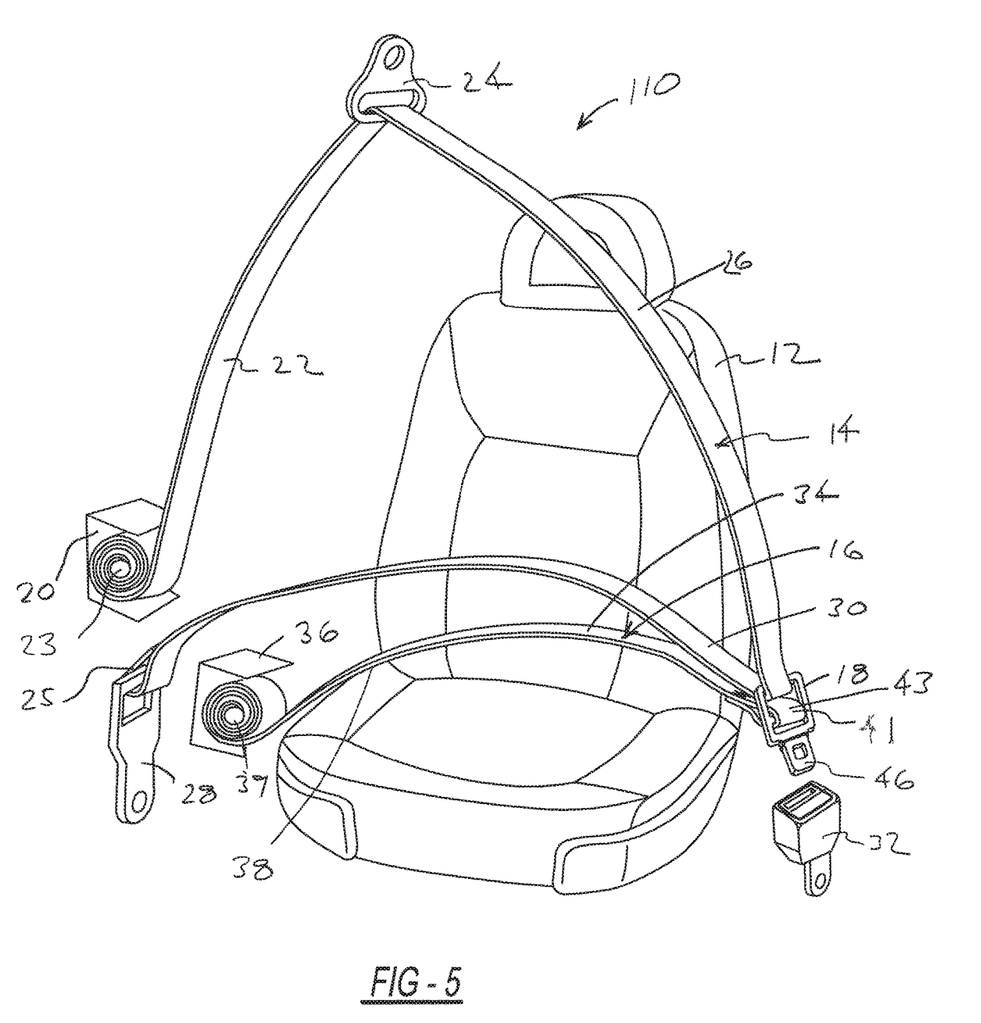
FIG. 5 is a perspective view similar to FIG. 1 showing a further embodiment of the present invention.

Now with reference to FIG. 5, a second embodiment of four-point seatbelt system 10 is shown which is generally designated by reference number 110. Elements of belt system 110 common with those of system 10 described previously are identified by like reference numbers and a duplicative description of these elements is omitted. System 110 differs from system 10 with regard to the routing of the belt webbing sections through latch plate 18. In the prior embodiment, webbing 22 of three-point belt assembly 14 is routed to pass through both slots 40 and 42 of latch plate 18 and over two-point belt system loop 43, as best illustrated by FIG. 2. In the four-point belt system 110, three-point belt assembly 14 is instead routed to pass only through the upper slot 40 of latch plate 18. As in the prior embodiment, two-point belt system loop 43 is attached to latch plate bridge 44.

These differing configurations change the positioning of two-point belt assembly 16 relative to lap belt section 30 of three-point belt assembly 14. In the case of system 10, two point lap assembly 16 webbing lies over lap belt section 30. By contrast in system 110, the order is reversed with two point belt assembly webbing 16 positioned under lap belt section 30. This alternative arrangement can produce different restraint performance. For example, in some conditions, the configuration of belt system 10 can cause lap belt portion 30 to be pinched by the two-point belt assembly 16 once the pelvis of the dummy or occupant starts to load the belt system. In system 110, the likelihood of such interference is potentially reduced since such pinching action does not occur.

Figure 6:
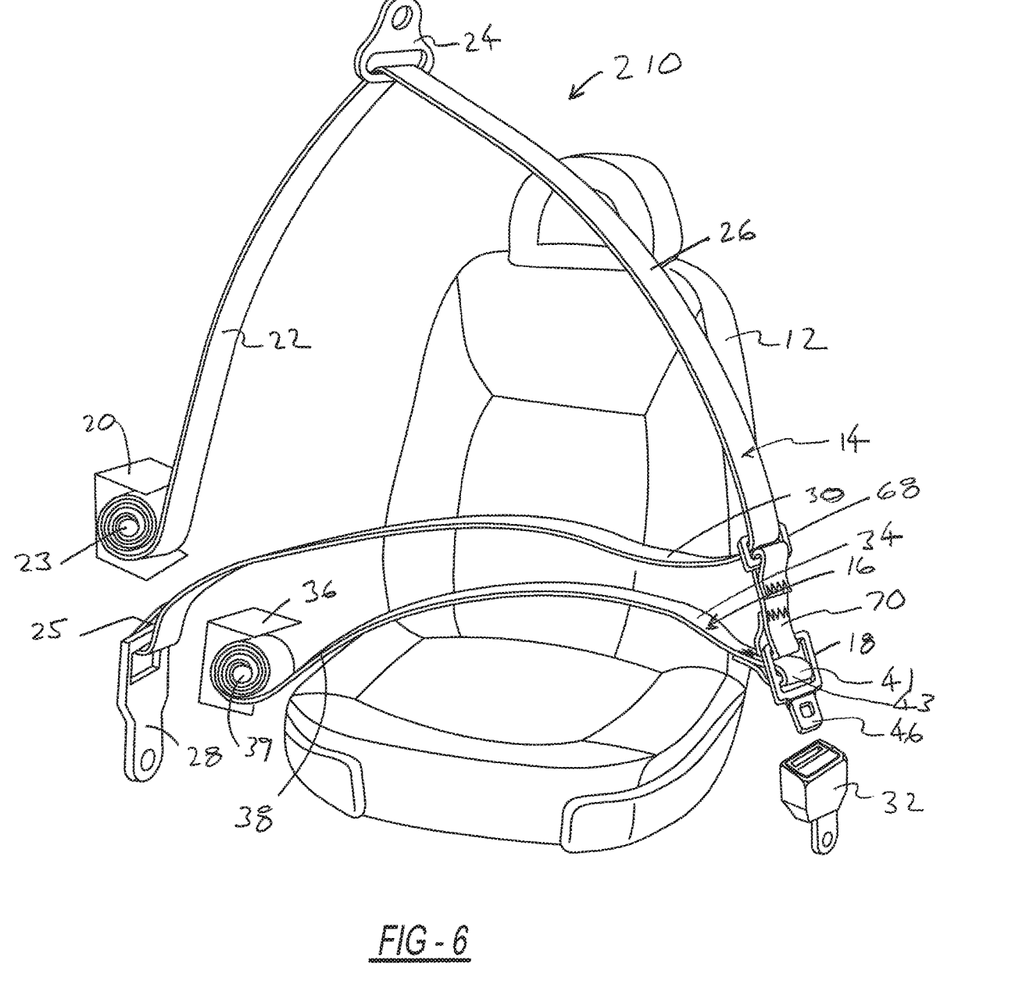
FIG. 6 is a perspective view similar to FIG. 1 showing a further embodiment of the present invention.

Now with reference to FIG. 6, a further alternative embodiment of four-point seatbelt system 210 is illustrated. Again, common elements will be identified by reference numbers and are described previously. In this embodiment, the functions of latch plate 18 are served by two separate components including latch plate 18 and guide plate 68. A short section of webbing extends between latch plate 18 and guide plate 68 and forms tongue extender 70. Tongue extender 70 is wrapped around the upper section of latch plate 18 above slot 40, and is further wrapped around an edge section of guide plate 68. Three-point belt assembly 14 webbing passes through the slot of guide plate 68 in the manner of a traditional guide plate. Two-point belt assembly webbing 16 is connected at latch plate bridge 44 as in prior embodiments. With the belt system 210 the use of tongue extender 70 allows shoulder belt section 26 to be positioned at a higher and perhaps more optimized location relative to the dummy or occupant which can improve load distribution on the upper torso during a restraint event. The configuration also allows lap belt portion 30 to be placed higher than the webbing of two-point belt assembly 16 so that the lap portions of the belt are prevented from any interference in the functioning of these two lap belt sections such as the pinching effect described previously.

While the above description constitutes the preferred embodiment of the present invention, it will be appreciated that the invention is susceptible to modification, variation and change without departing from the proper scope and fair meaning of the accompanying claims.

The invention claimed is:

1. A belt restraint system for a motor vehicle adapted for restraining an occupant in a motor vehicle seat comprising;
a three-point belt assembly having a first webbing with a first end connected with a first retractor and having a second end adapted to be anchored to the vehicle, the three-point belt assembly forming a first lap belt section and a shoulder belt section, the first webbing second end adapted to be anchored to the vehicle by a first seat belt anchor, the first seat belt anchor further having a webbing release mechanism adapted to be activated upon the detection of a dangerous condition of the vehicle to release a webbing slack loop fixed to a releasable pin to provide a load limiting function to reduce tension in the first webbing,
a latch plate coupled to the first webbing and adapted to be releasable affixed to a buckle anchored to the vehicle,
a two-point belt assembly having a second webbing coupled at a first end to a second retractor adapted to be anchored to the vehicle, and a second end affixed to the latch plate, the two-point belt assembly forming a second lap belt section,
whereby the three-point belt assembly and the two-point belt assembly cooperate in a condition of use of the restraint system with the latch plate connected with the buckle such that the first lap belt section and the second lap belt section extend across the lower torso of the occupant and the shoulder belt section extends diagonally across the upper torso of the occupant.

2. The belt restraint system in accordance with claim 1, further comprising, the latch plate adapted to permit the first webbing to slide through the latch plate such that the portions of the first webbing forming the lap belt and the shoulder belt sections have a variable length.

3. The belt restraint system in accordance with claim 2, further comprising, the latch plate forming a first and a second slot with the first webbing passing through the first slot and the second slot.

4. The belt restraint system in accordance with claim 3, further comprising, the latch plate forming a bridge segment between the first slot and the second slot and the second webbing second end affixed to the bridge segment.

5. The belt restraint system in accordance with claim 1, further comprising, the three-point belt system first webbing second end affixed to a second seat belt anchor.

6. The belt restraint system in accordance with claim 1, further comprising, the first retractor having a pretensioner function for retracting the first webbing upon the detection of a dangerous condition of the vehicle.

7. The belt restraint system in accordance with claim 1, further comprising, the second retractor having a pretensioner function for retracting the second webbing upon the detection of a dangerous condition of the vehicle.

8. The belt restraint system in accordance with claim 7, further comprising, the second retractor pretensioner function blocks the second webbing from retraction after operation of the pretensioner function.

9. The belt restraint system in accordance with claim 1, further comprising, the first retractor having an inertial sensing locking mechanism.

10. The belt restraint system in accordance with claim 1, further comprising, the first webbing second end adapted to be anchored to the vehicle by a first seat belt anchor fixedly mounted to the vehicle.

11. The belt restraint system in accordance with claim 2, further comprising the latch plate forming a first and a second slot with the first webbing passing through the first slot with the latch plate forming a bridge segment between the first and the second slot and the second webbing second end affixed to the bridge segment.

12. The belt restraint system in accordance with claim 11, further comprising the second lap belt section configured to overlie the first lap belt section on the lap of the occupant.

13. The belt restraint system in accordance with claim 11, further comprising the first lap belt section configured to overlie the second lap belt section relative to the lower torso of the occupant.

14. The belt restraint system in accordance with claim 1, further comprising, a guide plate connecting with the latch plate by a tongue extender the first webbing passing through a slot of the guide plate with the second webbing second end fastened to the latch plate.

15. A belt restraint system for a motor vehicle adapted for restraining an occupant in a motor vehicle seat comprising;
a three-point belt assembly having a first webbing with a first end connected with a first retractor and having a second end adapted to be anchored to the vehicle, the three-point belt assembly forming a first lap belt section and a shoulder belt section,
a latch plate adapted to be releasable affixed to a buckle adapted to be anchored to the vehicle,
a guide plate connected with the latch plate by a tongue extender, the first webbing passing through a slot of the guide plate and slidable along the first webbing,
a two-point belt assembly having a second webbing coupled at a first end to a second retractor adapted to be anchored to the vehicle, and a second end affixed to the latch plate, the two-point belt assembly forming a second lap belt section,
whereby the three-point belt assembly and the two-point belt assembly cooperate in a condition of use of the restraint system with the latch plate connected with the buckle such that the first lap belt section and the second lap belt section extend across the lower torso of the occupant and the shoulder belt section extends diagonally across the upper torso of the occupant.

16. The belt restraint system in accordance with claim 15, further comprising, the first webbing second end adapted to be anchored to the vehicle by a first seat belt anchor having a load limiting function to control tension in the first webbing.

17. The belt restraint system in accordance with claim 16, further comprising, the first seat belt anchor further having a webbing release mechanism adapted to be activated upon the detection of a dangerous condition of the vehicle to release a segment of the first webbing to reduce tension in the first webbing.

18. The belt restraint system in accordance with claim 17, further comprising, the segment of the first webbing in the form of a webbing slack loop which is fixed to a releasable pin.

19. The belt restraint system in accordance with claim 16, further comprising, the first webbing second end affixed to and wrapped around a spindle coupled to an anchor frame.

20. The belt restraint system in accordance with claim 19, further comprising the first webbing second end affixed to and wrapped around a spindle coupled to an anchor frame with a torsion bar, the torsion bar controlling tension in the first webbing in a restraint event.

21. The belt restraint system in accordance with claim 16, further comprising, the load limiting function provided by a webbing release mechanism which allows a predetermined length of the first webbing to be released from the first anchor upon receipt of a release signal and further having a tension controlling mechanism allowing a predetermined length of the webbing to be extracted from the first anchor under a controlled load, the second retractor having a pretensioning function, the system adapted to provide functions of operation including;

a first function upon a pretensioning of the two-point belt by the second retractor, the two-point belt adapted to restrain the pelvis of the occupant;

a second function in which the webbing release mechanism is activated,     a third function in which the webbing release mechanism is activated and the tension controlling mechanism operates to control belt tension, and     a fourth function in which the second retractor pretensioning function is activated to reduce tension in the second webbing.

22. The belt restraint system in accordance with claim 15, further comprising the latch plate forming a first and a second slot and a bridge segment between the first and the second slots with the second end of the two-point belt assembly affixed to the bridge segment.

23. The belt restraint system in accordance with claim 15, further comprising the first lap belt section configured to be positioned at a higher region of the occupant's lower torso as compared with the second lap belt section.

\* \* \* \* \*